Nov. 26, 1968

C. L. MOORMAN 3,413,041

IN-FLOOR AIR CASTER CARGO HANDLING SYSTEM

Filed May 23, 1967

INVENTOR.
Cletus L. Moorman

BY W. F. Wagner
ATTORNEY

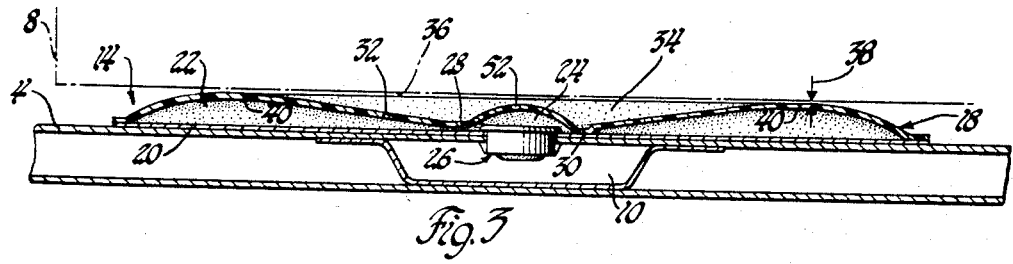
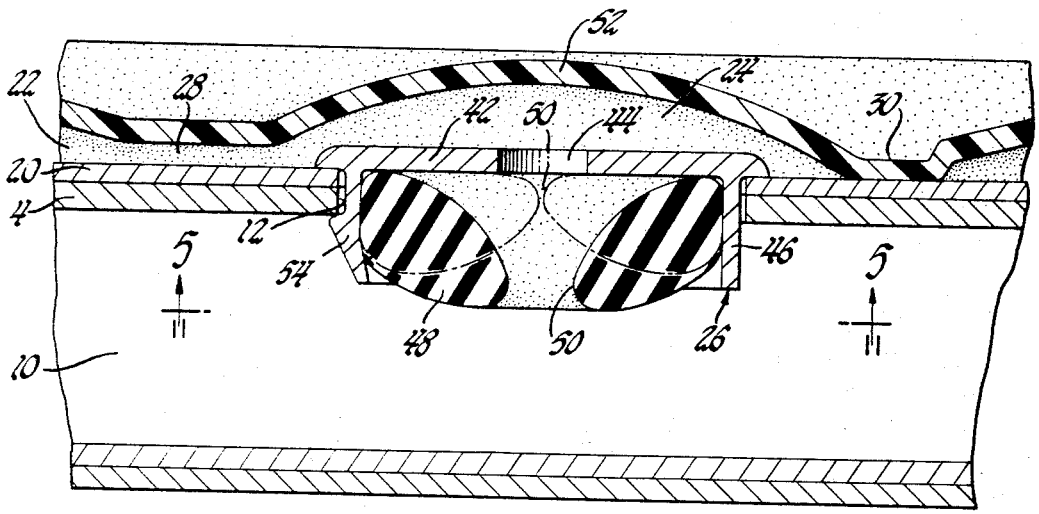
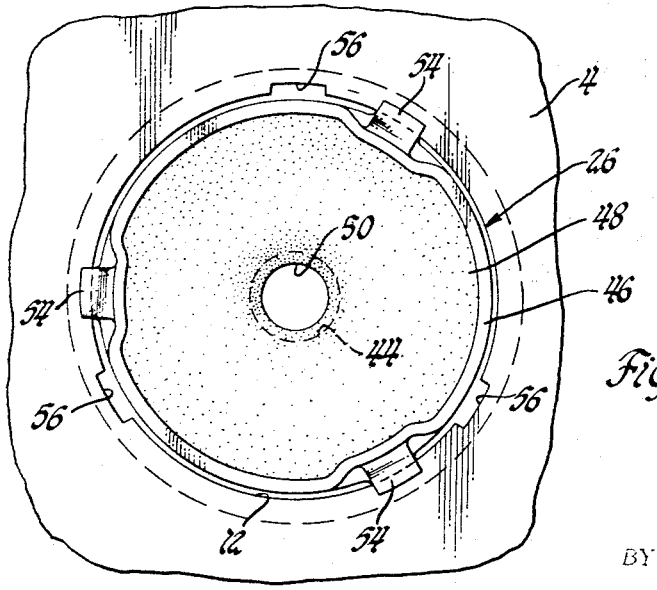

United States Patent Office 3,413,041
Patented Nov. 26, 1968

3,413,041
IN-FLOOR AIR CASTER CARGO
HANDLING SYSTEM
Cletus L. Moorman, Trotwood, Ohio, assignor to General
Motors Corporation, Detroit, Mich., a corporation of
Delaware
Filed May 23, 1967, Ser. No. 640,689
7 Claims. (Cl. 302—29)

ABSTRACT OF THE DISCLOSURE

A floor structure is formed with an air manifold system and a plurality of horizontally spaced openings communicating therewith in which are mounted a plurality of low unit loading air cushion assemblies providing a support medium enabling substantially frictionless mobility of cargo. Connection of the assemblies with their respective openings is accomplished by bayonet type mountings facilitating rapid assembly and disassembly. Each of the assemblies also includes valve structure which automatically diminishes air flow under no-load conditions.

---

This invention relates to materials handling systems and more particularly to systems of the type utilizing low pressure, low unit loading air cushion devices.

In recent years, a great deal of attention has been directed to the increasing problem of expeditiously handling cargo shipped on pallets, in containers, etc. In the past, the various transport mediums such as shipping, railroads and truck transport have relied primarily on a combination of brute force and utilization of fork lift trucks, dollies, and other forms of wheeled materials handling devices to accomplish loading and unloading of such cargo. However, with the spectacular increase in air transport of such cargo, the necessity for a more efficient and economical means of effecting cargo mobility during loading and unloading has become apparent.

In the air transport field, recognition of manifest inefficiencies of conventional practices in terms of time, the undesirability of encumbering aircraft structures with additional dead weight inherent in floor structures capable of tolerating high unit loadings, and numerous other factors have led to proposals involving introduction and maintenance of a film of air between the cargo floor of an aircraft and the cargo to be loaded therein in order to reduce frictional drag sufficient to enable manual maneuvering of the cargo into the desired position. In practice, however, application of this principle has not been entirely successful owing to difficulties in achieving a substantial degree of tolerance to surface irregularities in loads and additionally due to the relatively high air consumption inherent in conventional air bearing structures. Thus, even though under ideal conditions it is quite feasible to mobilize a cargo container in the manner described, for practical purposes, it is necessary to achieve such results at minimum operating expense and maximum tolerance to cargo-floor variables.

The present invention is directed to this end in providing means for establishing an efficient air cushion medium which exhibits extremely high efficiency in terms of air consumption together with a relatively high tolerance to floor-cargo variables.

The invention further contemplates a system in which maintenance and repair can be accomplished with speed and ease, and in which self-contained replaceable air cushion units are utilized.

The foregoing and other objects, advantages and features of the invention will become more fully apparent as reference is had to the accompanying specification and drawings wherein:

FIGURE 3 is an enlarged sectional side elevational view looking in the direction of arrows 3—3 of FIGURE 1;

FIGURE 4 is a greatly enlarged sectional elevational view of a portion of the structure shown in FIGURE 3; and FIGURE 5 is a fragmentary bottom plan view of a portion of the structure shown in FIGURE 4.

Figure 1:
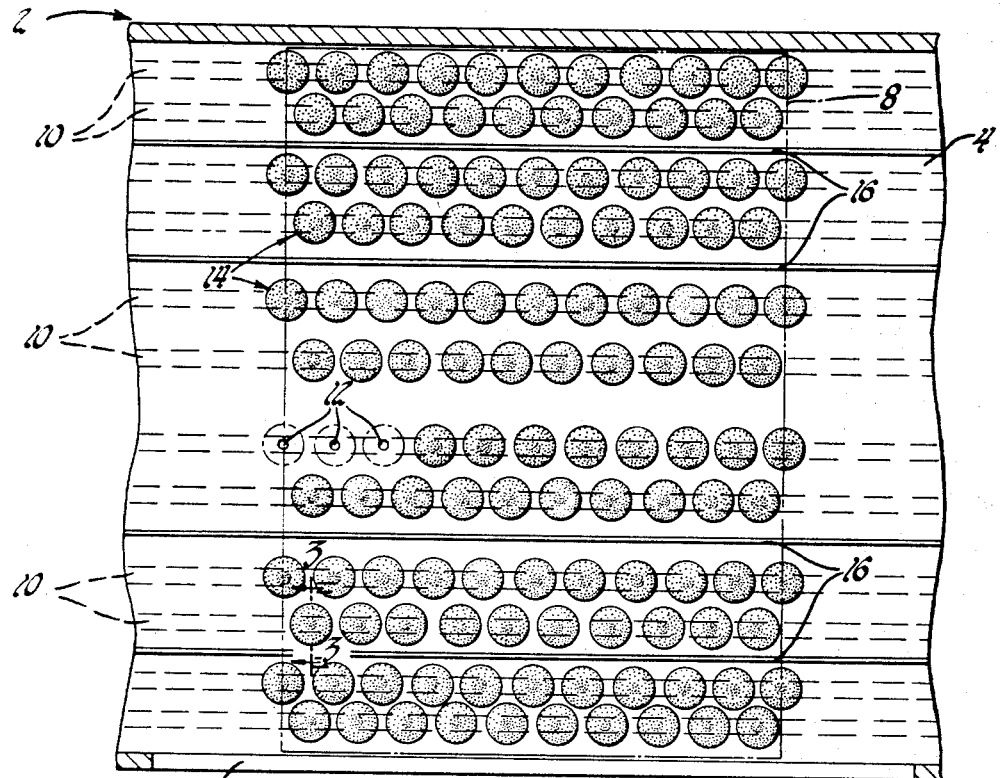
FIGURE 1 is a fragmentary plan view, partly in section, of an aircraft fuselage illustrating an in-floor air caster system in accordance with the invention.

Referring now to the drawings and particularly FIGURE 1, the reference numeral 2 generally designates an aircraft fuselage which includes a horizontal floor 4 extending the length of the cargo space. Reference numeral 6 generally designates the cargo door opening in the fuselage. In order to facilitate movement of cargo, such as a pallet structure 8, into the cargo hold of the aircraft, the floor 4 thereof is formed with an air manifold comprising a plurality of longitudinally extending ducts 10 which are connected to a suitable source of air at superatmospheric pressure. At selected longitudinal intervals, the floor 4 is formed with openings 12 arranged in vertical alignment with ducts 10. Openings 12, the preferred form of which is illustrated in FIGURE 5, are adapted to receive a plurality of low unit loading air bearing assemblies 14, certain of which have been omitted in FIGURE 1 for illustrative purposes. In the illustrated embodiment, assemblies 14 are approximately 9 inches in diameter and arranged in staggered pairs of columns which straddle conventional longitudinally extending seat tracks 16, thereby enabling conversion of the aircraft from cargo to passenger capability when desired.

Figure 2:
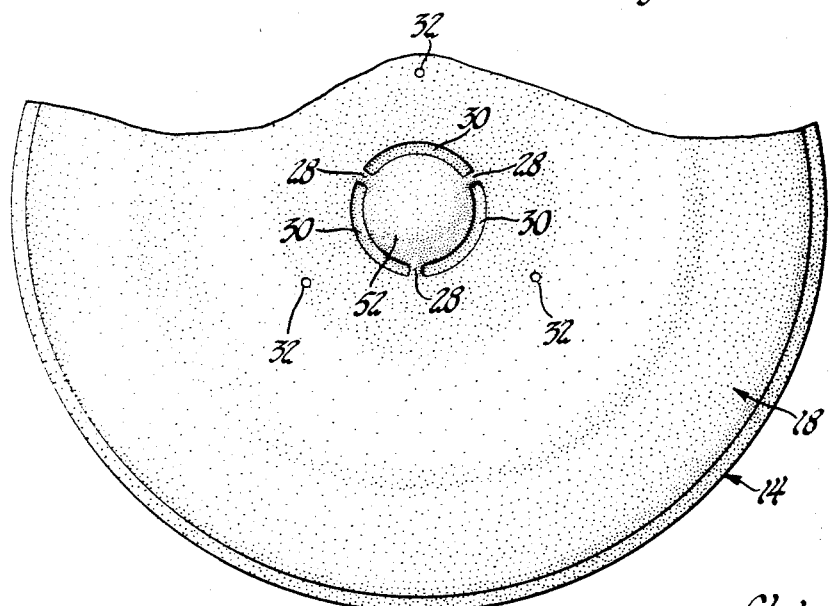
FIGURE 2 is an enlarged fragmentary plan view illustrating the details of construction of an individual air caster of the type illustrated in FIGURE 1.

In accordance with a principal feature of the invention, the air bearing assemblies 14 are of the low pressure, low unit loading type disclosed in U.S. Patent No. 3,321,038, Mackie et al., issued May 23, 1967, and entitled, "Air Cushion Device." In the form illustrated in detail in FIGURES 2 and 3, a flexible membrane 18 overlies and is peripherally and centrally bonded to a base plate 20 in a manner forming an outer annular chamber 22 between the membrane and the base plate 20 and an inner semi-spherical chamber 24 overlying an air admitting neck portion 26 formed centrally on base plate 20. Air entering neck portion 26 emerges into chamber 24 and passes into chamber 22 through tunnels 28 formed between the membrane and base plate by intermittently bonding the central portion of the membrane at 30 in a circular path outboard of neck portion 26. From chamber 22, air emerges through openings 32 into a generally frusto-conical cavity 34 formed between the membrane 18 and the load 8 disposed thereover. In this type of construction, the cavity 34 is bounded by a perimetrical throttling gap 38 (exaggerated for illustrative clarity) formed between the load and the portion 40 of the membrane lying in closest proximity thereto. In consequence, high compliance is attained between the portion 40 of the membrane and the lower surface 36 of the load so that extremely low air loss occurs. As a result, operation of the system involves minimal air pressure requirements. Additionally, the membrane 18 exhibits exception ability to comply with either irregularities in the cargo container lower surface or inclination thereof relative to the floor surface, with the result that the possibility of "grounding out" the container is minimized.

According to another feature of the invention, assemblies 14 include valving means acting between each assembly and the duct 10 so as to throttle or impede air flow when the surface area of membrane 18 is not subjected to load, i.e., when no cargo is disposed thereover, thus eliminating wasteful air consumption. As seen best in FIGURE 4, neck portion 26 includes an upper wall 42 having a central opening 44 and a depending cylindrical wall 46 which extends downwardly through opening 12. Disposed within cylindrical wall 46 and abutting wall 42 is an annular elastic element 48. Element 48 is of generally elliptical cross section, the major axis of which is normally inclined so as to define an imaginary inverted cone. Due to the relatively large frontal or upstream area presented by element 48, air flow in the direction of the arrows, when no load is disposed over assembly 14, biases the element 48 from the position shown in solid lines to that shown in dotted lines thereby progressively reducing the size of the throttling aperture 50 sufficient to substantially restrict air flow into assembly 14. Consequently, when the system is energized, but with no cargo or load being moved over a particular assembly, flow of air from duct 10 is automatically restricted to a neglible amount. However, as soon as a load is displaced to a position overlying the perimetrical throttling gap 38 of assembly 14, the minimum air flow permitted through the restricted throttling aperture 50 causes chambers 22 and 24 and cavity 34 to rapidly achieve pressure balance with that contained in duct 10 whereupon the element 48 is no longer subjected to a pressure differential and responds to its elastic memory to resume the position shown in solid lines, thereafter allowing sufficient air flow to maintain an effective air cushion between assembly 14 and load 36. Naturally, as soon as the load passes over the assembly, valve element 48 resumes a throttling position. It is to be particularly noted that the dome-like portion 52 of membrane 18 assures rapid operational activation of the assembly 14 due to the fact that upon relaxation of valve 48, the resulting increase in air flow is required to enter chamber 22 before emerging into cavity 34. Thus, momentary failure to inflate chamber 22, which might occur if air were permitted to flow directly into cavity 34, is avoided.

According to a further significant feature of the invention, means are provided to enable rapid attachment and removal of individual assemblies 14 relative to the floor structure 4. As seen best in FIGURES 4 and 5, the outer periphery of the cylindrical wall portion 46 is provided with radially projecting lugs 54 which are circumferentially spaced to register with corresponding radially outwardly notched portions 56 formed in each opening 12 of floor structure 4. In consequence, each assembly may be quickly disposed in operating relation by placing the neck portion 26 in registration with the associated opening 12 and rotating the entire assembly to bring the lugs 54 into vertical alignment with the portions of opening 12 between the notches formed therein. As a result, individual units 14 may be quickly removed and replaced. In addition, when desired, all of the units may be quickly removed and the exposed openings 12 completely covered by suitable temporary flooring strips provided at intervals with similar bayonet type fastening means.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:
1. An in-floor air caster system for accomplishing frictionless mobility of loads disposed thereon comprising, a rigid manifold substructure for conducting superatmospheric air, means forming a plurality of generally circular openings in the upper surface of said manifold, said openings being formed with circumferentially spaced radially outwardly notched portions, an air caster assembly disposed over each of said openings, said assembly including a base plate having a central air conducting member, said air conducting member depending into said opening and having radially outwardly projecting lugs adapted to register with said notches in at least one position of horizontal angular orientation, said lugs including portions providing vertical interlocking engagement with said circular opening when rotated to another position of horizontal angular orientation, flexible membrane means disposed over said base plate and bonded to the outer periphery thereof, means forming an intermittent bond between said membrane and said plate in a segmented circular path outboard of said air conducting member providing circumferentially spaced tunnel portions between said bonded segments connecting a first chamber formed between said plate and the portion of said membrane inboard of said segmented circular path with a second annular chamber formed between said base plate and the portion of said membrane outboard of said segmented circular path, and aperture means in said last mentioned membrane portion communicating with atmosphere.

2. The system of claim 1 including air flow control means mounted in said inlet opening.

3. The system of claim 2 wherein said flow control means comprises a pressure differential responsive member providing throttled flow at maximum pressure differential and full flow at minimum pressure differential, said minimum pressure differential occurring when said load reaches a position of translation completely overlying said bearing means.

4. The system of claim 3 wherein said pressure differential responsive member comprises an annular elastic element of generally elliptical cross section, said element being preformed so that the major axis of the ellipse is inclined to the axis of the element in the direction opposite normal air flow.

5. A low unit loading air caster assembly comprising, a base plate having a central air conducting member attached thereto including a neck portion extending vertically therefrom, a flexible membrane disposed over the surface of said base plate opposite said neck portion, means forming a continuous bond between the outer periphery of said membrane and said surface, means forming an intermittent bond between said membrane and said surface in an annular path outboard of said air conducting member, said membrane being preformed to provide an annular convolution defining a first chamber between said continuous and intermittent bonds and a domed central portion defining a second chamber inboard of said intermittent bond with the spaces between said intermittent bond forming tunnels connecting said chambers in communicating relation, and aperture means in the radially inner portion of said annular convolution communicating with atmosphere.

6. The structure set forth in claim 5 including bayonet type mounting means on said neck portion.

7. The structure set forth in claim 6 including pressure differential responsive flow control means mounted in said neck portion.

References Cited

UNITED STATES PATENTS

| | | | |
|---|---|---|---|
| 1,846,587 | 2/1932 | Diederich | 220—40 |
| 1,902,862 | 3/1933 | Kerr et al. | 220—40 |
| 2,785,928 | 3/1957 | Hanson | 302—29 X |

ANDRES H. NIELSEN, *Primary Examiner.*